US008847924B2

(12) United States Patent
Blythe et al.

(10) Patent No.: US 8,847,924 B2
(45) Date of Patent: Sep. 30, 2014

(54) REFLECTING LIGHT

(75) Inventors: Michael M. Blythe, Albany, OR (US);
Gregory W. Blythe, Philomath, OR
(US); Daniel T. Pinard, Corvallis, OR
(US); Terrill D. Snyder, Corvallis, OR
(US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2343 days.

(21) Appl. No.: 11/242,555

(22) Filed: Oct. 3, 2005

(65) Prior Publication Data

US 2007/0075648 A1  Apr. 5, 2007

(51) Int. Cl.
*G06F 3/042* (2006.01)

(52) U.S. Cl.
CPC .... *G06F 3/0421* (2013.01); *G06F 2203/04109* (2013.01); *G06F 3/0423* (2013.01)
USPC .......................................... 345/176; 345/102

(58) Field of Classification Search
USPC .......... 345/156, 173–178, 102, 104; 362/623; 359/460; 385/147
See application file for complete search history.

(56) References Cited

U.S. PATENT DOCUMENTS

| | | | |
|---|---|---|---|
| 3,128,340 A | 4/1964 | Harmon | |
| 3,500,063 A | 3/1970 | Reno et al. | |
| 3,613,066 A | 10/1971 | Cooreman | |
| 4,294,543 A | 10/1981 | Apple et al. | |
| 4,305,071 A | 12/1981 | Bell et al. | |
| 4,346,376 A | 8/1982 | Mallos | |
| 4,710,760 A | 12/1987 | Kasday | |
| 4,868,551 A | 9/1989 | Arditty et al. | |
| 4,963,859 A | 10/1990 | Parks | |
| 5,675,130 A * | 10/1997 | Sekizawa | 178/18.07 |
| 5,736,686 A | 4/1998 | Perret, Jr. et al. | |
| 5,831,601 A * | 11/1998 | Vogeley et al. | 345/175 |
| 6,130,663 A | 10/2000 | Null | |
| 6,166,370 A * | 12/2000 | Sayag | 250/221 |
| 6,172,667 B1 | 1/2001 | Sayag | |
| 6,334,689 B1 * | 1/2002 | Taniguchi et al. | 362/619 |
| 6,414,672 B2 | 7/2002 | Rekimoto et al. | |
| 6,480,187 B1 | 11/2002 | Sano et al. | |
| 6,538,644 B1 | 3/2003 | Muraoka | |
| 6,597,348 B1 * | 7/2003 | Yamazaki et al. | 345/175 |
| 6,650,822 B1 * | 11/2003 | Zhou | 385/147 |
| 6,729,543 B1 * | 5/2004 | Arons et al. | 235/462.13 |
| 6,907,183 B1 * | 6/2005 | Yoshida | 385/147 |
| 6,972,753 B1 * | 12/2005 | Kimura et al. | 345/175 |
| 7,242,388 B2 * | 7/2007 | Lieberman et al. | 345/158 |
| 7,368,703 B2 * | 5/2008 | De Samber et al. | 250/221 |
| 7,465,914 B2 * | 12/2008 | Eliasson et al. | 250/221 |
| 2003/0137494 A1 | 7/2003 | Tulbert | |
| 2004/0196665 A1 * | 10/2004 | Travis | 362/558 |
| 2006/0114237 A1 * | 6/2006 | Crockett et al. | 345/173 |
| 2006/0132453 A1 * | 6/2006 | Boyd et al. | 345/173 |

FOREIGN PATENT DOCUMENTS

FR           2 557 997         7/1985

* cited by examiner

*Primary Examiner* — Kenneth Bukowski
*Assistant Examiner* — Aaron Midkiff

(57) ABSTRACT

Embodiments of reflecting light off surfaces are disclosed.

29 Claims, 5 Drawing Sheets

REFLECTING LIGHT

BACKGROUND

Computing devices can utilize a number of input/output (I/O) components to provide additional functionality to the device. For example, one type of I/O component that may be used with a computing device is a touch screen. Some touch screens use visible light that may degrade the quality of the image projected on the surface of the display. Moreover, many touch screens allow a user to interact with a computing device by contacting the screen at a single point at a time, but not more than a single point. Some touch screens use materials that depress when an object, such as a finger, is placed in contact with the material. In such a device, the material may become worn or permanently deform.

DETAILED DESCRIPTION

Embodiments disclosed herein provide methods of using a screen, such as a touch screen, systems, and devices. Such embodiments can be useful, for example, for identifying a location of an object that is contacting a surface. Embodiments of the present disclosure include device embodiments having a number of light sensors and light sources, among other components. In various embodiments, the touch screen includes a number of light sources for directing light into a material and a number of light sensors for receiving light from the material. The material, which in various embodiments can take the form of a panel, also includes a surface on which an object can be placed. The placement of the object changes one or more characteristics of a portion of the light passing through the material. The sensors can be used to identify the change and identify the location of the contact between the object and the surface.

In some embodiments, the interactive functionality of a display can be accomplished through use of a number of sensors. For example, the number of sensors can include one or more cameras arrayed to receive light passing out of the material.

As used herein, directed light can include light that is visible and/or invisible to the unaided eye which is directed into a touch screen by a light source. Accordingly, reflected light is light that is visible and/or invisible to the unaided eye that originates from directed light, as defined above, but is created by the directed light interacting with an object or an interior surface of the material. The interaction with the object disrupts the path of the directed light.

In some embodiments, the touch screen can also include display functionality for providing images thereon. Images can be provided in a number of ways, including, Cathode Ray Tube (CRT), Liquid Crystal Display (LCD), plasma screens, as well as other projecting and/or light directing mechanisms.

Figure 1:
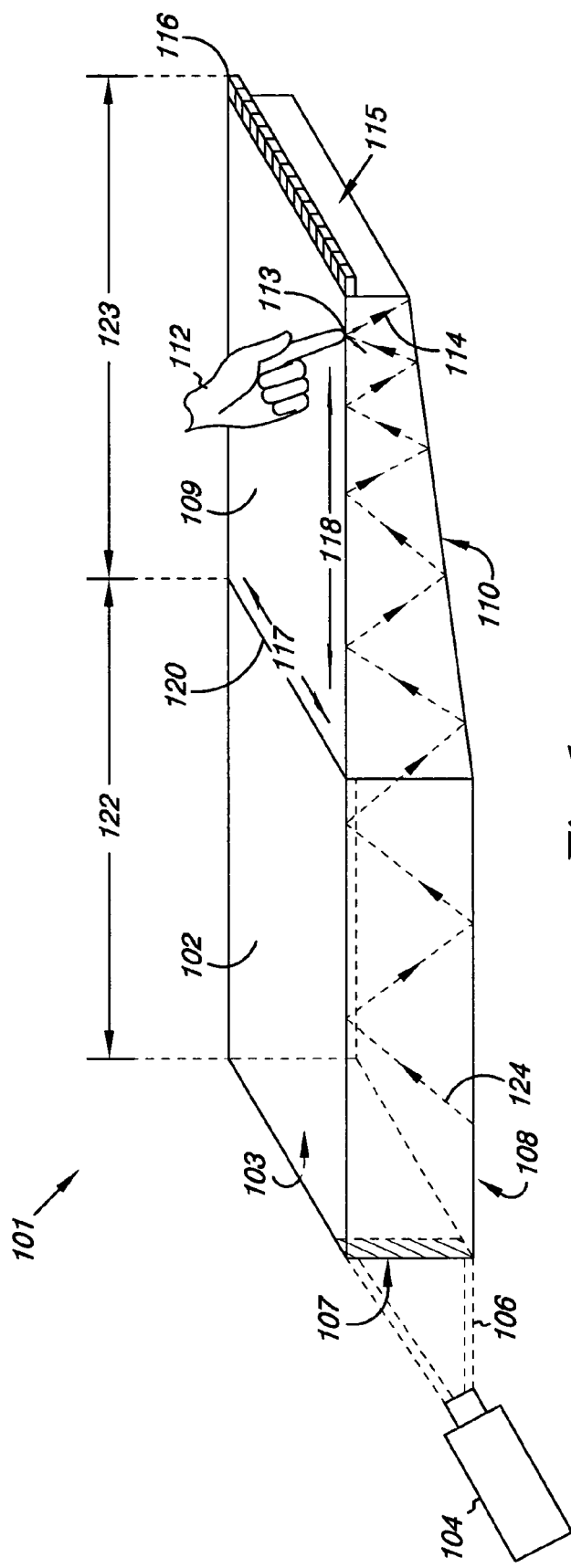
FIG. 1 illustrates an embodiment of a touch screen suitable to implement embodiments of the present disclosure.

FIG. 1 illustrates an embodiment of a touch screen. The figures herein follow a numbering convention in which the first digit or digits correspond to the drawing figure number and the remaining digits identify an element in the drawing. Similar elements between different figures may be identified by the use of similar digits. For example, 102 may reference element "102" in FIG. 1, and a similar element may be referenced as 202 in FIG. 2. As will be appreciated, elements shown in the various embodiments herein can be added, exchanged, and/or eliminated so as to provide a number of additional embodiments.

In various embodiments, a touch screen can include transparent (e.g., a viewer can see through the display), semi-transparent (e.g., semi-opaque, such as a see through surface, but an opaque opposing surface or a cloudy material), and/or opaque materials. A transparent material can provide additional functionality to the device, as will be discussed more fully below. For example, transparent materials can be used as displays that can be formed from a variety of materials that include, but are not limited to, glass, plastic, a combination of glass and plastic, crystal, and/or other suitable materials. Such materials can be formed into panels suitable to implement various embodiments of the present disclosure.

Touch screens can include a number of surfaces, faces, ends, and edges. For example, in the embodiment illustrated in FIG. 1, the touch screen 101 generally includes a display surface 109, a first end 103, and a second end 115. In various embodiments, a display surface 109 can include a face of the touch screen.

The embodiment of FIG. 1 also illustrates the touch screen 101 as having an angled surface 110. In various embodiments, positioning the touch screen 101 horizontally can provide for users of the touch screen to be seated around the touch screen and/or place objects on a surface and/or touch the surface of the touch screen. However, the same embodiment as well as other embodiments can be oriented vertically, among other orientations.

In the embodiment shown in FIG. 1, the touch screen 101 uses a wedge screen design concept which includes an expansion region 122 and an angled region 123. The expansion region 122 and the angled region 123 can be formed separately, having an interface 120, or can include a seamless interface.

In a seamless interface, the interface 120 is the transition from the expansion region 122 to the angled region 123. In various embodiments, the expansion region 122 can provide a region where light, directed into the touch screen 101, can fan out before reaching the angled region 123, as will be discussed more fully below.

In the embodiment shown in FIG. 1, the expansion region 122 includes a first surface 102, a second surface 108, and a first end 103. In various embodiments, the first and second surfaces 102 and 108 can be parallel. The use of parallel surfaces can provide for internal reflection of a light beam as the light beam propagates within the expansion region 122 of the touch screen 101 toward the angled region 123. In addition, parallel surfaces can reflect light beams without changing their angles of incidence. In other words, the angles at which a light beam 124 enters the expansion region and reflects off surfaces therein can remain unchanged as the light beam 124 propagates within the expansion region 122.

In the embodiment shown in FIG. 1, the angled region 123 includes a display surface 109 and an angled surface 110. In various embodiments, the angled surface 110 can be angled relative to the display surface 109, such that the angled region 123 has varying thicknesses. For example, as shown in FIG. 1, the angled surface 110 of the angled region 123 is angled relative to the display surface 109 such that at the beginning of the angled region 123, i.e., the interface 120, the angled region 123 has a first thickness at interface 120 and a second thickness at second end 115. Angling the angled surface 110 relative to the display surface 109 can provide for a light beam 124 propagating within the touch screen 101 to emerge from the display surface 109. This type of device structure can thereby be used to form an image thereon, as will be discussed more fully below.

In some embodiments, one or more ends, one or more faces, and/or one or more back surfaces can include a reflective surface. For example, a reflective coating, such as a paint or film, can be provided to increase internal reflection of a light beam propagating within the panel. In such embodiments, the intensity of the light source directing light into the display can, in some instances, be decreased, as will be discussed more fully below.

Also shown in the embodiment of FIG. 1 is a light source 104. Light source 104 can include any suitable light source capable of directing or providing light, including a beam of light. In addition, light sources can include light sources for directing a beam of light to form an image on a display surface. In various embodiments, light sources can include, but are not limited to, incandescent, halogen, infrared, light emitting diode (LED), and laser light sources, among others.

Light can be scanned over various surfaces of the touch screen 101, including the first end 103. In order to accomplish such scanning, a light source can be moved (e.g. up and down, and/or side to side) to direct light over various portions of the first end 103 during a scan cycle.

In some embodiments, the light source can be pivoted from side to side and/or up and down to accomplish the scanning motion. Also, multiple lights can be provided, and in various embodiments the light sources can be turned on and off such that directed light 106 is provided along various portions of the first end 103 during a scan cycle. For example, an array of LED's can be provided and selectively turned off and on to scan directed light 106 over the first end 103.

In various embodiments, directed light 106 can also be scanned over a surface of the touch screen 101 by first directing light into one or more prisms and/or mirrors. By moving the light source 104 and/or the one or more prisms/mirrors, the light can be directed to scan over a surface.

In various embodiments, a beam of light can include one or more light rays. For purposes of clarity, however, in the embodiments illustrated in FIGS. 1-4 herein, the light rays defining an edge of a light beam or an example of a propagating light ray are illustrated. As shown in FIG. 1, light source 104 provides a directed light beam 106 into first end 103 of the touch screen 101.

As the directed light beam 106 enters the touch screen 101 and propagates within the touch screen 101, the propagating light beam 124 can reflect off one or more surfaces, one or more ends, and/or one or more back surfaces. In the embodiment shown in FIG. 1, propagating light beam 124 reflects off the first surface 102 and the second surface 108 of the expansion region 122.

In various embodiments, one or more of the internal surfaces of the touch screen 101 can be designed to provide total internal reflection of a light beam 124. As used herein, total internal reflection of a light beam is a reflection of a light beam off a surface, such as the surfaces of the expansion region 122 and the angled region 123, the one or more ends, and/or the one or more back surfaces, with no emergence, or substantially no emergence of the light beam from the surface. In various embodiments, a light beam can continue propagating on its reflective path until impinging on a surface at or less than its smallest angle, with respect to a normal to a surface, for total internal reflection, where the light beam emerges from the surface of the display.

The smallest angle for total internal reflection is the angle (with respect to a normal to a surface) less than which a light beam, when impinging upon the surface, will pass through the surface rather than be reflected off the surface. By way of example and not by way of limitation, the directed light beam 106 of FIG. 1, directed into the touch screen 101 through first end 103, may propagate through the expansion region 122 by reflecting off of the internal surfaces of the first surface 102 and the second surface 108.

The light can pass through the interface 120 and into the angled region 123, where the light beam can reflect off of the inner surfaces of the display surface 109 and the angled surface 110 by total internal reflection. When the light impinges on the inner surface of second end 115, the angle of incidence of the beam, relative to the second end 115, can be less than the smallest angle, with respect to a normal to second end 115, for total internal reflection such that the light beam passes through the second end 115 and out of the angled region 123.

As the light beam 124 reflects off of the inner surfaces of the expansion region 122, the angle of incidence of the light may remain constant. In various embodiments, the angle of incidence of the light beam 124, as it passes through the angled region 123, may remain substantially constant, as it reflects off of the inner surfaces of the angled region 123, or the angle of incidence may change.

The angle of incidence of the light beam propagating within the angled region 123 can change based on a number of factors. For example, reflection off of the inner surface of the angled surface 110 may change the angle of incidence.

Another way in which the angle of incidence of the light beam 124 propagating within the angled region 123 may change is through an interaction with an object 112 contacting the display surface 109. In the embodiments of the present disclosure, an object can include one or more items, devices, components, and/or individuals that contact the display. For example, in the embodiment in FIG. 1, the touch screen 101 includes object 112.

In some embodiments, object 112 can include a reflective surface. Objects that include reflective surfaces can provide a higher amount of reflection when the object contacts the display surface 109 and, therefore in some embodiments, a lower intensity light source can be used with objects having a reflective surface.

Objects in proximity to or contacting the outside of a surface of a material when light is reflecting off of the inside surface of the material can change the angle at which the light reflects off of the inside surface. A number of embodiments of the current disclosure detect this change in the angle of incidence of light propagating within a touch screen to identify the location of an object contacting a surface of the touch screen.

In some embodiments of the present disclosure, this location of a point of contact on a display surface can correspond with a selection or data entry made by a user of a touch screen. For example, a point of contact on a display surface can correspond with the selection of one of a number of multiple choice answers presented on a display (e.g. item A, item B, item C, or item D). This selection or entry of data can be used in conjunction with other data entry devices, including, but not limited to, pointers, keyboards, mice, keypads, etc.

The embodiment of the present disclosure shown in FIG. 1 includes an array of light sensors 116. In the embodiment shown in FIG. 1, the array of light sensors 116 is scanned over the second end 115 such that it is capable of capturing light exiting the angled region 123 of the touch screen 101 through the second end 115. In some embodiments of the present disclosure, the touch screen 101 detects the location of a point of contact 113 on the display surface 109 by identifying which light sensor of the light sensor array 116 detects disrupted light and at what point, along the light array scan over second end 115, the light sensor identifies the disrupted light.

Disrupted light can include light having greater and/or lesser intensity, having a changed angle of incidence, an absence of light, and/or other changes in the characteristics of the light. These characteristics can be compared, through logic circuitry and/or executable instructions, to other light various values including, but not limited to; previous light sensor readings for that position; other light sensors readings from that scan and/or previous scans; benchmark and/or threshold light readings established prior to the scan an/or during manufacturing, among other time frames; and/or other suitable values that could provide useful comparison.

In such embodiments, areas of the display screen can correspond to an area on the second end 115, where propagating light, reflecting off of a particular location of the inner surface of the display surface 109, will be received by a particular light sensor at a particular point along that sensor's scan path. Thus, for each location on the display surface 109 there is a corresponding scan position for a light sensor of the light sensor array 116.

Based upon this information, embodiments of the present disclosure can correlate locations along a scan route in which a light sensor of light sensor array 116 receives light to a location on the display surface 109. In this way, for example, this correlation can be used to indicate a selection a user has made while interacting with the touch screen. In various embodiments, an increase or decrease in received light at a location along the scan route of a light sensor of light array 116 can correspond to an object 112 contacting the display surface 109.

In some embodiments, an object 112 contacting the display surface 109 can change the angle of incidence of a light beam 124 reflecting off of the inner surface the display surface 109, whereby a light sensor of the light sensor array 116 scanning over the second end 115 can receive light at a particular location along its scan route that it would not have received had object 112 not changed the angle of incidence of the propagating light beam 124 and producing reflected light 114. Moreover, a light sensor of light sensor array 116 may receive less light at a particular location along the scan route because the light beam that would have been received at the particular location had a change in course as a result of the object 112 contacting the display surface 109. Receiving more or less light at a location along the scan path can correspond to a point of contact 113 between an object 112 and the display surface 109. As discussed above, an object, contacting the display screen at a particular location, can correspond to a user making a choice from a selection on the display or entering data.

In various embodiments of the present disclosure, the light source 104 may direct light continuously over the entire or substantially the entire first end 103. In some embodiments of the present disclosure, the light source 104 may scan a beam of light over the first end 103. For example, the directed light beam 106 may cover a portion of the first end 103 at any instance, such as the hatched section 107 of first end 103 while not covering other portions of the first end 103.

The light source 104 can, in some embodiments, scan the directed light beam 106 over the entire first end 103 such that the beam impinges on some or all of first end 103 at some time during a scan. For example, as the light source 104 scans the directed light beam 106 over the first end 103, the propagating light beam 124 can reflect off of different portions of the inner surface of the display surface 109 during the course of a scan. Thus, the propagating light beam 124 can be scanned across the range 117 of the display surface 109.

In some embodiments, the location along the range 117 that the light beam 124 is scanning when a greater or lesser amount of light is received by a light sensor from the light sensor array 116 can be used to identify a location of a point of contact 113 on the display surface 109 between an object 112 and the display surface 109.

The point along the scan cycle of the light sensor array 116 at which a light sensor receives more or less light can also be used to correspond to a particular location along a range 118 of the display surface 109. This information can then be used to calculate a location of a point of contact 113 between the display surface 109 and the object 112. Such calculation can be accomplished by a number of executable instructions and/or logic circuitry.

Figure 2:
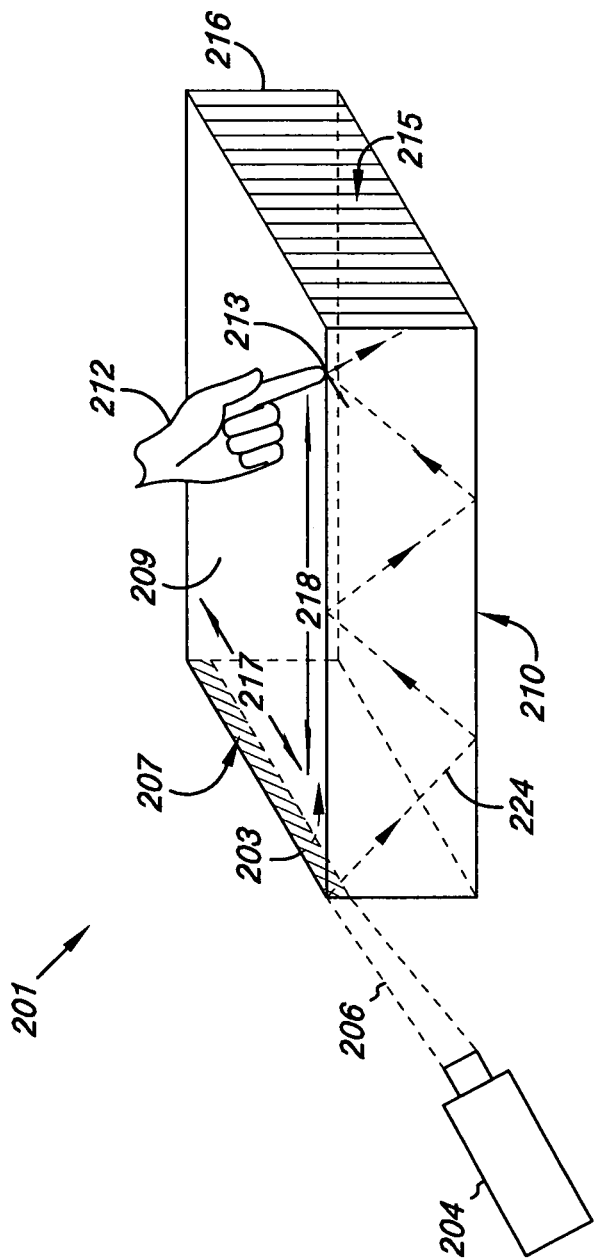
FIG. 2 illustrates another embodiment of a touch screen suitable to implement embodiments of the present disclosure.

FIG. 2 illustrates another embodiment of the present disclosure. In the embodiment of FIG. 2, a touch screen 201 receives directed light beam 206 provided by light source 204. The directed light beam 206, after entering the touch screen 201 through the first end 203, propagates through the touch screen 201 by reflecting off of the internal surfaces, including a display surface 209 and a back surface 210. In various embodiments of the present disclosure, the display surface and the back surface can be parallel to one another, or angled relative to one another.

Light directed into the panel can exit through various surfaces. For example, in the embodiment of FIG. 2, the light beam 224 exits the touch screen 201 through the second end 215.

Also shown in FIG. 2 is light source 204 to direct light, for example a beam of light, into a display. In addition, light sources can be used to direct light to form an image on a surface, as will be discussed in more detail below.

In the embodiment shown in FIG. 2, light source 204 directs a beam of light into the first end 203 of the touch screen 201. The directed light beam 206 propagates within the touch screen 201, for example, by reflecting off one or more surfaces, ends, and/or edges.

In various embodiments, the light beam 224 can continue propagating on its reflective path until impinging on a surface at or less than its smallest angle, with respect to a normal to the surface, for total internal reflection, whereupon the light beam will emerge from a surface of the touch screen. In this way, the directed light can exit the material.

The embodiment of the present disclosure shown in FIG. 2 includes a light sensor array 216 on the second end 215. A light sensor of the light sensor array 216 can be configured in various manners. For example, in the embodiment of FIG. 2, the light sensors of light sensor array 216 are each shaped as columns. Light sensor arrays can include one or more light sensors for detecting changes in one or more characteristics of the light exiting the material.

In some embodiments, the light source 204 can provide the directed light beam 206 such that the directed light beam 206 scans over the surface of the first end 203. FIG. 2 illustrates an embodiment having the directed light beam 206 impinging on the first surface 203 over a limited area, represented as the hatched section 207. In various embodiments, the light source 204 can provide the directed light beam 206 such that the area of light impinging on the first end 203 covers part or the entire surface of the first end 203 during each scan cycle.

As the directed light beam 206 is scanned over the first end 203 the propagating light beam 224 reflects off of various locations of the inner surface of the display surface 209. In such embodiments, a part of or the entire display surface 209 can be scanned during each scan cycle.

In some embodiments of the present disclosure, the touch screen 201 detects the location of a point of contact 213 of an object 212 on the display surface 209 by determining which light sensor of the light sensor array 216 detects the light and the location, along the scan cycle, of the light source 204 when the light sensor received the light.

In various embodiments of the present disclosure, as the light source 204 scans the directed light beam 206 over the first end 203, the internally propagating light beam 224 will reflect off of different portions of the inner surfaces of the display surface 209 during the course of a scan cycle. In the embodiment shown in FIG. 2, the directed light 206 is scanned over the first surface 203 in horizontal segments, for example, from top to bottom. The light impinging on the first surface 203 is shown as a hatched region 207 and, as the directed light 206 is scanned over the first end 203, the inner surface of the display surface 209 is scanned by the internally propagating light beam 224 during the scan cycle.

The light beam propagating within the touch screen 201 can be disrupted by multiple objects (e.g. objects such as the finger of a hand illustrated at 212 in FIG. 2, among others). Thus, in various embodiments, multiple objects can contact the display surface 209 (e.g., at 213) and can result in a disruption of the internal reflection of one or more light beams propagating within the display. In such embodiments, the disrupted and/or scattered light beams due to the multiple objects can emerge from the display at the second end 215 and be received by sensors of the light sensor array 216.

In various embodiments, executable instructions can be used for generating x and y coordinates of a touch screen. The executable instructions can be executed by a processor (e.g. as a component of a computing device) or other type of logic circuitry. The x and y coordinates can be used to aid in determining the position of an object contacting the display. For example, in various embodiments, a Cartesian coordinate plane having an x and y axis can be determined based upon an area of a display surface that provides for internal reflection of a directed light beam, a viewable area of a display, and/or an interactive area of a display. As used herein, an interactive area of a display is any area of a display that can be used to disrupt (e.g., scatter and/or reflect) light.

Referring to FIG. 2, the x and y coordinate axes can correspond to ranges 217 and 218 of the display surface. In the embodiment of FIG. 2, since the directed light is a horizontal beam and the sensor array includes a number of vertically arranged sensors, the position of the disruption can be identified. In such embodiments, the beam may be a pixel in height and the sensors may be a pixel in width such that the location of the disruption can potentially be localized to within one pixel.

By way of example, and not by way of limitation, the light source 204 can scan directed light 206 over the first surface 203, thereby scanning the light over various inner portions of the display surface 209. In such embodiments, the scan position of the light source, for instance, or the angle and/or position at which directed light 209 enters the touch screen 201, can be designed to correspond to an axial coordinate position along the range 218. This correspondence with a position can be used to determine the position of a point of contact on the display surface 209, in one axis.

Accordingly, the scan position of the light source 204, when a light sensor detects a disruption, can then be used to identify a position, along the range 218, of an object contacting the display surface 209. For example, hardware and/or software can be used to calculate the position of contact based upon the detection of the contact and the position of the light source.

Moreover, in some embodiments, the particular light sensor of the light sensor array 216 that detects the disruption can identify a coordinate along the range 217. The coordinates along the ranges 217 and 218 can correspond with x and y coordinates or other mechanisms for determining position.

In some embodiments, the sensors of the light sensor array can be able to identify where upon the sensor light intensity is greater or less. In such embodiments, the location of the point of contact can be calculated based upon a correlation between the location on one or more particular sensors where the contact was sensed and the location of the point of contact on the display surface. Hardware and/or software can be used to make such correlations.

Figure 3:
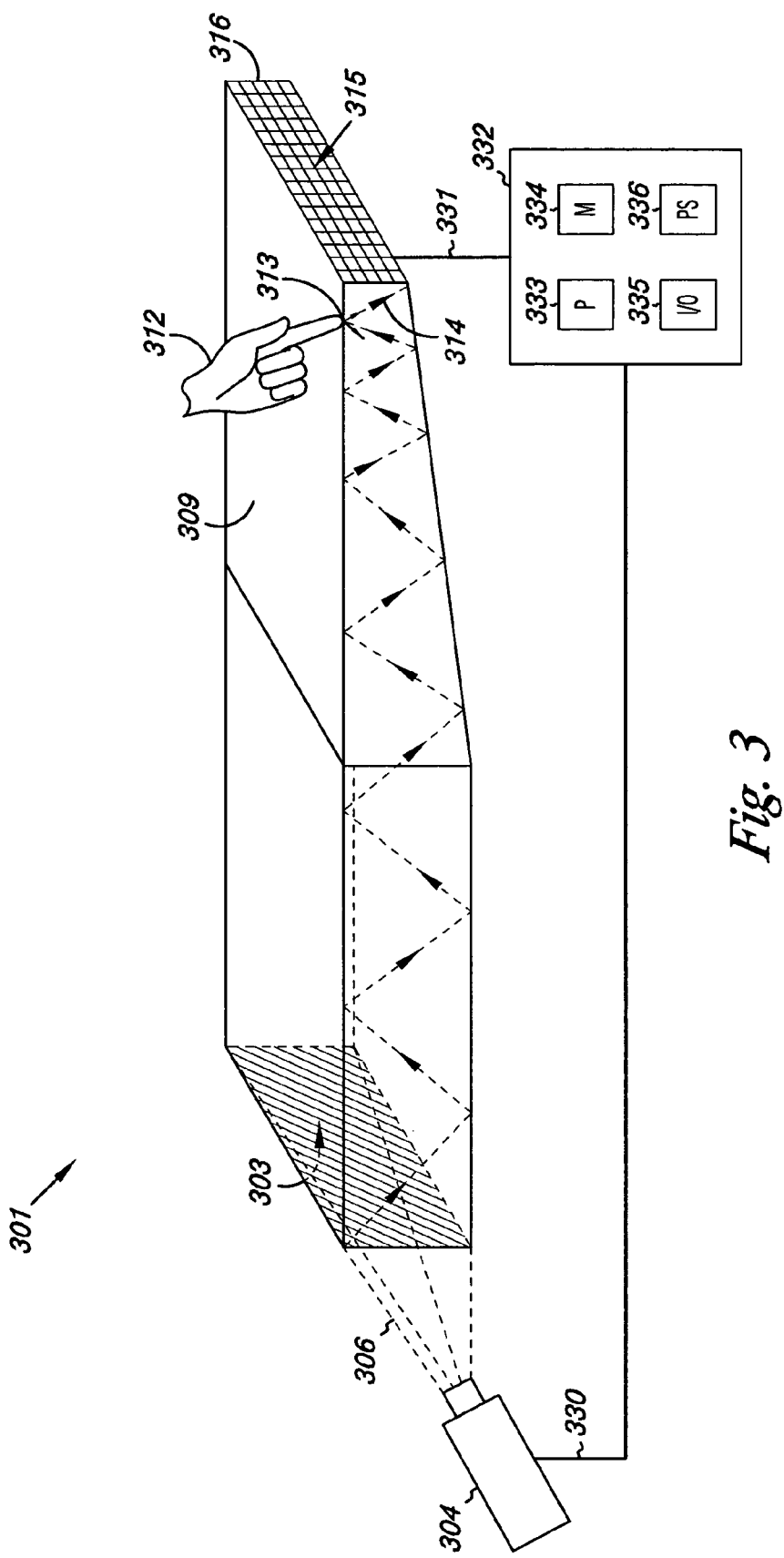
FIG. 3 illustrates another embodiment of a touch screen suitable to implement embodiments of the present disclosure.

FIG. 3 illustrates another embodiment of a touch screen. Many aspects of the touch screen 301 are similar to the embodiments illustrated in FIGS. 1 and 2, including the propagation of light within the touch screen material by internal reflection. Also, a beam of light can similarly be disrupted by an object 312, contacting the display surface 309 at a point of contact 313. This contact can act to scatter the light, thereby changing the angle of incidence of the light with respect to the display surface 309.

In the embodiment illustrated in FIG. 3, directed light 306 is provided by the light source 304. The directed light 306 impinges on the first end 303. Directed light 306 can be flooded, scanned, or flashed by the light source 304 on any surface of the touch screen 301. As discussed previously, light can be received by a number of sensors. In the embodiment of FIG. 3, a number of sensors are arrayed in a light sensor grid 316 on the second end 315.

A particular location on the display surface 309 can correspond to one or more light sensors of the light sensor grid 316. For example, as object 312 contacts the display surface 309 and disrupts the propagating light to make reflected light 314, changing the path of the propagating light, a particular light sensor of light sensor grid 316 may receive more or less directed light 306 and/or reflected light 314 than would have been received had the object 312 not contacted the display surface 309. Therefore, an increase or decrease in the amount of light detected by a light sensor can indicate the location of a point of contact 313 between the object 312 and the display surface 309.

This information can be used to calculate a location of a point of contact 313 between the display surface 309 and the object 312, as discussed above. Furthermore, this information related to a location of a point of contact 313 on the display surface 309 can also be used to register a user selection, wherein the location of the point of contact 313 on the display surface 309 corresponds to an image or character displayed on the display surface 309, as discussed above.

The embodiment illustrated in FIG. 3 also shows a controller module 332. The controller module 332 can include executable instructions to send and receive commands and data. For example, in the embodiment shown in FIG. 3, the controller module 332 is in communication with the light source 304 via connection 330 and is also in communication with the light sensor grid 316 via connection 331.

As shown in the embodiment of FIG. 3, the controller module 332 includes a processor 333, memory 334, input/output module 335, and a power source 336. In various embodiments of the present disclosure, executable instructions can be embodied in software, firmware, and/or circuit logic, among others, and can be stored in memory, such as memory 334. The processor 333 and memory 334 can be used with executable instructions to identify a location of an object contacting one or more surfaces of the touch screen 301, as discussed above.

Memory 334 can also be used for holding executable instructions for determining coordinate data corresponding to objects contacting a surface of a touch screen and other data that can be used to determine the location of an object. In various embodiments, memory 334 can include executable instructions to control the light sources, sensors, displays, and/or other components of touch screens and systems used with the embodiments of the present disclosure.

Memory 334 can include various volatile and/or non-volatile memory types. For example, in various embodiments, memory 334 can include volatile and/or non-volatile memory, such as ROM, RAM, and flash memory, for example. Memory can be provided that is magnetic and/or optically readable, among others.

In various embodiments, the touch screen can also include a light source for providing an image. This image light source can be provided in conjunction with the embodiments herein discussed, among other embodiments.

Figure 4:
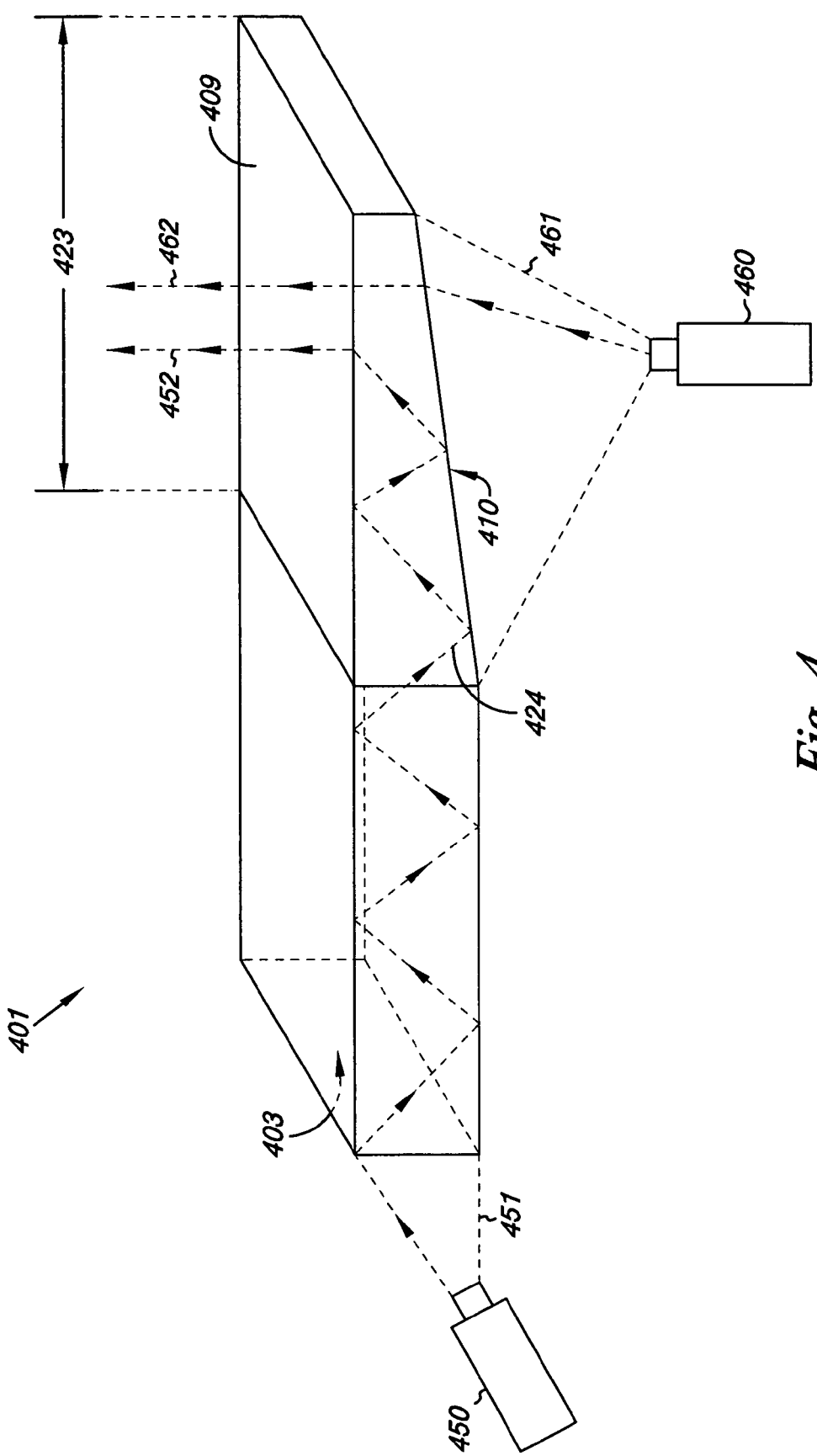
FIG. 4 illustrates an embodiment of the present disclosure for providing an image on an embodiment of a touch screen.

For example, in the embodiment shown in FIG. 4, two imaging light sources are shown, including an end imaging light source 450 and a backlight imaging light source 460. In the embodiment of FIG. 4, the end imaging light source 450 emits a beam of light 451, which forms an image (e.g., an array of pixels) on display surface 409.

In some embodiments, the beam of light 451 can include digital data representing the array of pixels forming the image. In such embodiments, a second light source may not be utilized. In some embodiments, an image can also be formed from pixels, or pixel data, from the backlight 461 provided by the backlight imaging light source 460.

As the light 424 propagates through the angled region 423, each time a ray bounces off angled surface 410, its direction will change with respect to the display surface 409. Repeated reflections will lead to the angle between the light 424 and the display surface 409 getting progressively smaller until the beam's smallest angle for total internal reflection is reached and the beam emerges from the touch screen 401, as shown by the emerged light 452. When light enters the touch screen 401, generally, the larger the angle between the light and a normal to the surface of the panel, the greater the number of internal reflections that will occur before it emerges.

This also means that a light beam, having a large angle, can generally travel further within the angled region 423 before emerging. Thus, the angle at which the beam of light 451 enters the touch screen 401 can determine at which position on the display surface 409 of the touch screen 401 the light will emerge. By knowing at which position the various light rays will emerge, from the display surface 409 of touch screen 401, an image can be formed thereon.

For example, end imaging light source 450 can provide a beam of light 451 into the first end 403 of the touch screen 401. As discussed above, the light can propagate within the touch screen by internal reflection.

Moreover, when the light reaches the angled region 423 of the touch screen, the angle of reflection off of internal surfaces can change such that the light passes through the display surface 409. In various embodiments, in ways similar to the discussion above, directing light to impinge on a different location of the first end 403 can cause the light to impinge on different parts of the display surface 409.

Furthermore, light can also be directed such that it impinges on a specific location on the inside of the display surface 409 at such an angle that the light passes through the display surface 409 instead of continuing to reflect internally within the touch screen 401. Therefore, images can be provided on the display surface 409, among other surfaces, by directing light into a surface of the touch screen 401.

In some embodiments, an image can also be provided by directing the backlight 461 with a backlight image light source 460 onto the angled surface 410 of the touch screen 401. For example, in various embodiments of the present disclosure, backlight 461, directed in this manner, does not reflect off of internal surfaces of the panel, but impinges on the angled surface 410 and the display surface 409, at such an angle, that it passes through each surface, providing emerged light 462. In some embodiments, the surfaces 409 and 410 can be parallel to each other. In this way, an image can be provided. In various embodiments, end imaging light source 450 and backlight imaging light source 460 can be used together or separately to provide images on the touch screen 401.

One benefit of using the end imaging light source 450 to provide the image, and/or the light source for sensing, is that the touch screen 401 can have a small form factor, as compared to other imaging mechanisms on displays, including touch screens. In various embodiments, multiple light sources can be located at or near light sources 450 and/or 460.

Figure 5:
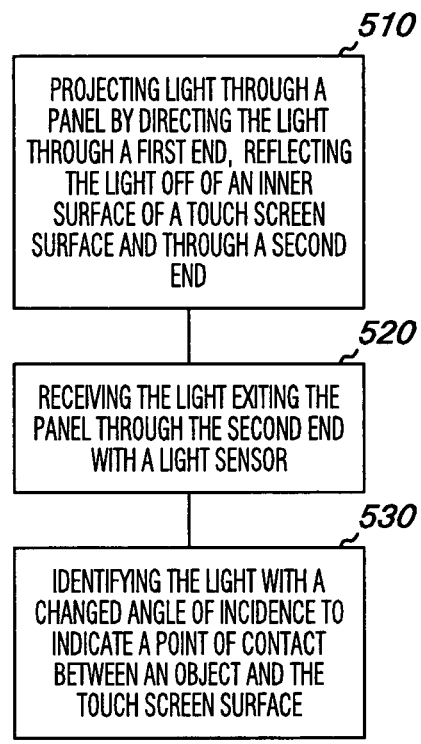
FIG. 5 illustrates a block diagram outlining an embodiment of a method for implementing embodiments of the present disclosure.

FIG. 5 shows a block diagram of an embodiment of the present disclosure representing a method for locating a point of contact on a display. In block 510, the method includes projecting light through a panel by directing the light through a first end, reflecting the light off of an inner surface of a touch screen surface and through a second end.

In block 520, the method includes receiving the light exiting the panel through the second end with a light sensor. In block 530, the method includes identifying the light with a changed angle of incidence to indicate a point of contact between an object and the touch screen surface. This change can be determined, for example, based upon a change in the intensity of light received by a sensor. Such changes can be identified, for example, by comparison with previously received light, comparison with an expected intensity value, and/or comparison with other received light intensity values and can be accomplished through logic circuitry and/or executable instructions utilized to make the comparisons.

The method of block 530 can include identifying the light with a changed angle of incidence by detecting the light with different light sensors. In some embodiments the light being received can be detected at different locations after having been disrupted.

In the embodiments described in this disclosure, the identification of a location of an object contacting a surface of a touch screen can include interactions between a touch screen and an object. In various embodiments, the interactions between a touch screen and an object can be utilized in fields including, but not limited to, gaming, video conferencing, data processing, interactions by an individual with the display device and a user interface provided on a display of the display device, and other such interactions.

Although specific embodiments have been illustrated and described herein, it will be appreciated from this disclosure that any arrangement to achieve the same techniques can be substituted for the specific embodiments shown. This disclosure is intended to cover all adaptations or variations of various embodiments of the present disclosure.

It is to be understood that the above description has been made in an illustrative fashion, and not a restrictive one. Combination of the above embodiments, and other embodiments not specifically described herein, will be apparent upon reviewing the above description.

The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted such that the embodiments of the present disclosure have to include more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

The invention claimed is:

1. A touch screen apparatus, comprising:
    a material having a first end, a second end opposite the first end, a first region having a uniform thickness and including the first end, a second region having a varying thickness and including the second end, and a surface between the first end and the second end for contact by an object;
    an end imaging light source to direct light into the first region at the first end, reflect the light off internal surfaces of the material within the first region and the second region including the surface, and to cause the light to exit the second region at the second end;
    a backlight imaging light source to direct light through the second region without reflection off the internal surfaces of the material within the second region and form an image on the surface of the material in the second region; and
    a sensor to detect disruption of the light at the second end.

2. The apparatus of claim 1, wherein the end imaging light source includes a configuration to provide directed light that is a beam of light.

3. The apparatus of claim 1, wherein the material includes a configuration to change an angle of incidence of light reflecting internally based upon contact by the object on the surface.

4. The apparatus of claim 1, wherein the light sensor includes a configuration to detect a change in an angle of incidence of light when the material is contacted by the object.

5. The apparatus of claim 1, wherein the apparatus includes a logic component to identify a location of the object contacting the surface of the material.

6. The apparatus of claim 1, wherein the apparatus includes a plurality of light sensors to detect whether light that has exited the second end is disrupted.

7. The apparatus of claim 6, wherein the plurality of light sensors are provided to detect multiple locations of objects contacting the surface at different locations.

8. The apparatus of claim 1, the apparatus including an image viewable through the surface of the material.

9. A method, comprising:
    directing light with an end imaging light source into a first end of a first region of a member;
    reflecting the light off of an inner surface of the member;
    receiving the light exiting the member through a surface of a second end of a second region of the member opposite the first end with a light sensor provided on the surface of the second end of the second region;
    identifying the light with a changed angle of incidence to indicate a point of contact between an object and a surface of the member; and
    directing light with a backlight imaging light source through the second region of the member without reflection off inner surfaces of the member within the second region and forming an image on the surface of the member in the second region;
    wherein reflecting the light includes propagating the light between parallel surfaces of the first region and between non-parallel surfaces of the second region,
    wherein the point of contact between the object and the surface of the member includes contact with one of the non-parallel surfaces of the second region.

10. The method of claim 9, wherein directing light with an end imaging light source includes scanning the directed light over the first end to change a location that the directed light internally reflects off of the inner surface of the member.

11. The method of claim 9, wherein receiving the light exiting the member includes scanning the light sensor over the second end.

12. The method of claim 9, wherein directing light with an end imaging light source includes directing light in a non-visible range.

13. The method of claim 9, wherein directing light with an end imaging light source includes directing light through a transparent panel.

14. The method of claim 9, wherein directing light with an end imaging light source includes scanning a light beam across the first end such that the light beam reflects off of different portions of the inner surface of the member during a scan cycle.

15. The method of claim 14, where the light sensor moves to receive the light beam.

16. A touch screen system, comprising:
    a panel having a touch screen surface opposite an angled surface, wherein the touch screen surface is planar and the angled surface is non-parallel with the touch screen surface;
    a first light source to direct an end imaging beam of light into the panel through a first end of the panel such that the first beam of light undergoes internal reflection between an inner surface of each of the touch screen surface and the angled surface and passes out of a second end of the panel opposite the first end;
    a second light source to direct a backlight imaging beam of light onto the angled surface such that the second beam of light passes through the angled surface and the touch screen surface without internal reflection between the inner surface of each of the touch screen surface and the angled surface; and
    means, provided at the second end of the panel, for detecting a location of a point of contact between an object and the touch screen surface.

17. The touch screen system of claim 16, further including means for providing an image viewable through the touch screen surface.

18. The touch screen system of claim 16, wherein the means for detecting includes an array of sensors arranged to sense a change in an angle of incidence of light passing out of the second end.

19. The touch screen system of claim 16, wherein the means for detecting includes an array of sensors arranged to sense a change in an intensity of light passing out of the second end.

20. The touch screen system of claim 16, wherein the means for detecting includes a number of movable sensors.

21. The touch screen system of claim 16, wherein the means for detecting includes a sensor for capturing the directed beam of light passing out of the second end.

22. The touch screen system of claim 21, wherein the means for detecting includes an array of movable sensors, arranged to move as a unit, configured to sense a change in an angle of incidence of light passing out of the second end.

23. The touch screen system of claim 16, further including:
a computing device comprising:
   a processor;
   a memory; and
   wherein means for detecting the location of a point of contact includes executable instructions stored in memory and executable on the processor to determine the location of the point of contact between the object and the touch screen surface based on the location of the end imaging light source and one or more light sensors receiving light that has been influenced by the object.

24. A touch sensitive display device, comprising:
a panel comprising:
   a display surface;
   a first end of a first region; and
   a second end of a second region opposite the first end;
an end imaging light source to direct light into the panel through the first end of the first region such that the light reflects off of at least one inside surface of the panel, including an inner surface of the display surface, and exits the panel through a surface of the second end of the second region; a backlight imaging light source to direct light through the second region without reflection off inside surfaces of the panel within the second region and form an image on the display surface of the panel in the second region; and
a sensor provided on the surface of the second end of the second region to detect the directed light from the second end of the second region, wherein the sensor is moved across the second end and receives light that has had its angle of incidence changed due to an object contacting the display surface,
wherein the first region provides parallel surfaces for internal reflection of the light therein, and the second region provides non-parallel surfaces for emergence of the light therefrom,
wherein a location of a point of contact between the object and the display surface includes contact with one of the non-parallel surfaces of the second region.

25. The display device of claim 24, wherein the end imaging light source provides infrared light.

26. The display device of claim 24, wherein the end imaging light source provides a beam of light scanned across the first end such that the beam reflects off of the entire inner surface of the display surface during a scan cycle.

27. The display device of claim 26, wherein the location of the point of contact between the object and the display surface can be identified by a location and an angle from which the end imaging light source directs the light.

28. The display device of claim 24, wherein the sensor is movable to capture light exiting the panel.

29. The display device of claim 28, wherein the location of the point of contact between the object and the display surface can be identified by a location of the sensor when it receives light that has exited through the second end.

* * * * *

UNITED STATES PATENT AND TRADEMARK OFFICE
CERTIFICATE OF CORRECTION

PATENT NO. : 8,847,924 B2  Page 1 of 1
APPLICATION NO. : 11/242555
DATED : September 30, 2014
INVENTOR(S) : Michael M. Blythe et al.

It is certified that error appears in the above-identified patent and that said Letters Patent is hereby corrected as shown below:

IN THE CLAIMS:

In column 12, line 40, in Claim 16, delete "a first" and insert -- an end imaging --, therefor.

In column 12, line 40, in Claim 16, delete "an end imaging" and insert -- a first --, therefor.

In column 12, line 46, in Claim 16, delete "a second" and insert -- a backlight imaging --, therefor.

In column 12, line 46, in Claim 16, delete "'a backlight imaging" and insert -- a second --, therefor.

Signed and Sealed this
Third Day of February, 2015

Michelle K. Lee
*Deputy Director of the United States Patent and Trademark Office*